United States Patent [19]
Moore

[11] Patent Number: 5,851,418
[45] Date of Patent: Dec. 22, 1998

[54] PARTICULATE LOW CORROSION ICE MELTERS

[75] Inventor: William Percy Moore, Hopewell, Va.

[73] Assignee: Agri-Nutrients Technology Group, Inc., Disputanta, Va.

[21] Appl. No.: 942,865

[22] Filed: Oct. 2, 1997

[51] Int. Cl.$^6$ ....................................................... C09K 3/18
[52] U.S. Cl. ............................................... 252/70; 106/13
[58] Field of Search ................................. 106/13; 252/70

[56] References Cited

U.S. PATENT DOCUMENTS

| | | | |
|---|---|---|---|
| 4,803,007 | 2/1989 | Garber | 252/70 |
| 4,990,278 | 2/1991 | Wyeth | 252/70 |
| 5,211,868 | 5/1993 | Ireland et al. | 252/70 |
| 5,296,167 | 3/1994 | Murray | 252/70 |

OTHER PUBLICATIONS

WPIDS Abstract No. 73–13280U, abstract of Great Britain Patent Specification No. 1,308,780, Mar. 1973.
WPIDS Abstract No. 92–349630, abstract of Canadian Patent Specification No. 2,060,125, Aug. 1992.
WPIDS Abstract No. 92–159771, abstract of Canadian Patent Specification No. 2,049,698, Feb. 1992.

*Primary Examiner*—Anthony Green

[57] ABSTRACT

An economical attrition resistant granular composition for melting ice and inhibiting corrosion of metals and spalling of Portland Cement Concrete and asphalt comprising primarily a water soluble chloride salt, such as sodium chloride, or magnesium chloride; very small amounts of an oxygen scavenger such as sodium nitrite; a surface deactivating corrosion inhibitor such as sodium borate; and an in-situ formed water soluble phosphate salt such as ammonium phosphate amounting to between 1 and 10 percent exhibiting a property of chemically reacting with metal surfaces to form protective coatings of insoluble metal phosphate salts, the soluble phosphate salt serving as an adhesive and a buffering agent to provide hard granules of ice melter with a pH between 5 and 8. A method of preparing the composition is provided.

10 Claims, No Drawings

PARTICULATE LOW CORROSION ICE MELTERS

FIELD OF THE INVENTION

The present invention is directed to an economical attrition resistant particulate composition for effectively melting ice from useful surfaces such as roadways, walkways, driveways, parking areas, bridges, porches, decks, industrial machines, and other such areas while inhibiting corrosion of metals and spalling of concrete and asphalt surfaces normally contacted by ice melters. The present invention is also directed to a method for preparing the new ice melter composition.

BACKGROUND OF THE INVENTION

In cold weather, water freezes on many useful surfaces making them hazardous. Chloride salts, such as sodium, potassium, magnesium, and calcium chlorides, have been used for a long time to melt ice, but all of these salts are aggressively corrosive to metals and cause spalling on Portland Cement Concrete and asphalt surfaces they contact.

In recent years relatively expensive magnesium and calcium acetates have been used as granular ice melters, thereby reducing the corrosion and spalling rates to levels lower than those of chloride salts. Further improvements were reported in my pending U.S. Ser. No. 08/800,164, now U.S. Pat. No. 5,730,895 where coatings of calcium and magnesium acetates were applied onto granules of chloride salts containing corrosion inhibitors.

Some corrosion inhibitors in the prior art have been reported to reduce the corrosion rates of chloride salts on metals. However none of these inhibitors have been reported to decrease spalling of Portland Cement Concrete and asphalt in the presence of the ice melter. Further there has been no use of water soluble phosphate salts with, or without, additional inhibitors to bind the chloride salts into attrition resistant particles.

OBJECTS OF THE INVENTION

It is a primary object of this invention to provide an economical particulate composition for melting ice which also inhibits corrosion of metals it contacts.

It is another primary object of this invention to provide an economical ice melter composition which inhibits spalling of Portland Cement Concrete and asphalt surfaces in contact with the ice melter.

It is another primary object of this invention to provide an economical attrition resistant granular ice melter composition.

It is another primary object of this invention to provide an effective method of preparing these improved ice melter compositions.

SUMMARY OF THE INVENTION

I have now discovered a new attrition resistant particulate composition for effectively melting ice, and inhibiting corrosion of metals and spalling of Portland Cement Concrete and asphalt, comprising primarily a water soluble chloride salt of a metal having a positive valence of from 1 to 2, such as sodium, potassium, magnesium, and calcium; and additionally smaller amounts of a water soluble phosphate salt having an ability of chemically reacting with metal surfaces to form thereon protective coatings of insoluble phosphate salts. The soluble phosphate salt must be mixed as a concentrated aqueous solution with the chloride salt to serve as a binder and a buffering agent to provide hard particles. It was found that the composition must be dried to a low moisture level to function effectively. The specific materials and the physical structure of the composition are required to provide the effective new ice melter of this invention. It is particularly surprising that the composition of this invention inhibits spalling of concrete and asphalt in addition to inhibiting metal corrosion.

It is also surprising that corrosion inhibition may be enhanced by adding extremely small amounts of oxygen scavenging and surface deactivating chemicals to the composition.

The discovery of this invention includes a new and effective method of preparing the new composition, the method requiring agitating a chloride salt and then adding sufficient aqueous phosphate salt solution to bind the chloride salt into damp pH buffered agglomerates, and then drying the agglomerates to a low moisture level to harden them to attrition resistant granules.

DESCRIPTION OF THE INVENTION

The present invention is directed to an attrition resistant composition for effectively melting ice and inhibiting corrosion of metals and spalling of Portland Cement Concrete and asphalt. To be effective, the composition must comprise a water soluble chloride of a metal, which has a positive valence of from 1 to 2, and amounts to between 90 and 99 percent of the ice melter composition; and a water soluble phosphate salt amounting to from 1 to 10 percent on a dry basis. The phosphate salt must exhibit a property of chemically reacting with metal surfaces to form protective coatings of insoluble metal salts. Further, it is necessary that the soluble phosphate salt be admixed in the chloride salt as an aqueous solution at a concentration of from 40 to 85 percent so that it serves as a binder and a buffering agent to provide hard particles at a pH of from 5 to 8 when the required moisture level of from 0.1 to 4.0 percent is obtained by drying.

Water soluble chloride salts of metals with positive valences of from 1 to 2, which are effective in the present particulate composition, are potassium chloride, sodium chloride, magnesium chloride, calcium chlorides and mixtures of these salts.

Water soluble phosphate salts which are effective in the present particulate ice melter composition are ammonium phosphate, sodium phosphate, potassium phosphate, ammonium polyphosphate, sodium pyrophosphate, and potassium pyrophosphate.

The ice melter compositions economically provide the most effective corrosion and spalling inhibition when the soluble phosphate salt amounts to from 2 to 7 percent of the composition on a dry basis.

The best resistance to attrition of the ice melter particles is obtained when the composition is dried to a moisture content of from 0.1 to 2.0 percent of the composition.

The strongest ice melter particles with the best resistance to attrition are obtained with the lowest costs when the water soluble phosphate salts are formed in-situ by reaction of phosphoric acid in solution with a salt-forming base. The effective salt forming bases are sodium hydroxide, sodium carbonate, potassium hydroxide, potassium carbonate, anhydrous ammonia, and aqueous ammonia.

I have discovered that when the concentrated aqueous phosphate is used in binding and pH buffering the metal chloride salts of the present invention, metal corrosion and spalling of concrete and asphalt surfaces are reduced to low levels. Surprisingly, it was found that the inhibition of corrosion of metals could be enhanced further. The particulate ice melting composition to achieve this, comprised, a water soluble chloride salt of a metal exhibiting a positive valence of from 1 to 2, amounting to from 90 to 98 percent of the composition, with the composition also containing from about 0.05 to 1.0 percent of an oxygen scavenger. Oxygen scavengers found to provide the most enhancement of corrosion inhibition are sodium nitrite, potassium nitrite, and sodium fluoborate. Also effective in enhancing corrosion inhibition were surface deactivating corrosion inhibitors amounting to from 0.05 to 1.0 percent. Deactivating inhibitors found effective include sodium borate, sodium silicate, potassium silicate, sodium ferricyanide, sodium ferrocyanide, sodium ferrocyanate, and triethanolamine.

In addition to the foregoing chloride salt and small amounts of inhibitors, the enhanced composition contains a water soluble phosphate salt amounting to from 1 to 10 percent on a dry basis. It is still necessary that the phosphate salt have a property of chemically reacting with metal surfaces to form protective coatings of insoluble metal phosphate salts, and that the water soluble phosphate salt be admixed with the chloride salt containing the oxygen scavenger and the surface deactivating corrosion inhibitors as an aqueous solution at a concentration of from 40 to 85 percent. The concentrated phosphate solution serves as an adhesive and a buffering agent to provide hard particles at a pH of from 5 to 8 when a moisture content in the composition of from 0.1 to 4.0 percent is provided.

Chloride salts effective in the enhanced corrosion inhibition composition include potassium chloride, sodium chloride, magnesium chloride, calcium chloride, and mixtures thereof. In this composition, effective water soluble phosphates are ammonium phosphate, sodium phosphate, potassium phosphate, ammonium polyphosphate, sodium polyphosphate, sodium pyrophosphate, and potassium pyrophosphate.

I have discovered a method for preparing the forgoing composition as attrition resistant granules which may be used for effectively melting ice without causing damage to metal, concrete, and asphalt surfaces it contacts. In this method, a water soluble chloride salt of metal with a positive valence of from 1 to 2 and amounting to from 90 to 98 percent of the total ice melter is agitated at a temperature of from 45° to 110° C. While continuing to agitate, sufficient aqueous phosphate solution is added to produce a pH of from 5 to 8 and to bind the chloride salt into damp agglomerates. Best operation is obtained when the concentration of water soluble phosphate salt is from 40 to 85 percent. The phosphate salt must amount to from 2 to 10 percent of the granules on a dry basis, and it is necessary that it have the property of reacting with aluminum and ferrous metal surfaces to form insoluble protective coatings of metal phosphates.

The final step in the present method is drying to a moisture content of from 0.1 to 4.0 percent to harden the agglomerates to attrition resistant granules.

The method is effective when the water soluble chloride salt is potassium chloride, sodium chloride, magnesium chloride, calcium chloride, or a mixture of these salts; and when the water soluble phosphate salt is ammonium phosphate, sodium phosphate,, potassium phosphate, ammonium polyphosphate, sodium polyphosphate, sodium pyrophosphate, potassium pyrophosphate, or a mixture of these salts.

Best results are obtained with the method when the phosphate salt amounts to from 2 to 7 percent and the attrition resistant granules are dried to a moisture content of from 0.1 to 2.0 percent.

Most economical and effective operation of the method is obtained when the water soluble phosphate salt is formed in-situ by reaction of phosphoric acid in solution with a salt forming base. Effective bases are sodium hydroxide, sodium carbonate, potassium hydroxide, potassium carbonate, anhydrous ammonia, and aqueous ammonia.

In the instant method, the water soluble chloride salts may be agitated and mixed with the soluble phosphate salts and the oxygen scavenging and surface deactivating inhibitors by a variety of means and devices. In the preferred method of preparing attrition resistant granules for effectively melting ice with enhanced inhibition to corrosion on metals, the water soluble chloride salt of one of the metals, including potassium, sodium, magnesium, calcium, and their mixtures is agitated mechanically by moving metal blades until the chloride salt forms a fluidized bed of particles. To the fluidized chloride salt, amounting to from 90 to 98 percent of the ice melting granules, is admixed from 0.05 to 1.0 percent of an alkli metal nitrite, and from 0.05 to 1.0 percent of a surface deactivating corrosion inhibitor. Preferred surface deactivating corrosion inhibitors include sodium borate, sodium ferricyanide, and sodium silicate.

The preferred method of preparation is continued while the bed remains fluidized by then admixing aqueous phosphoric acid, preferably containing between 45 and 61 percent $P_2O_5$, and sufficient base to react with the phosphoric acid to provide a pH between 6.0 and 7.5 and produce a water soluble phosphate salt solution with a concentration between 40 and 85 percent. The amount of phosphoric acid added is adjusted to provide water soluble phosphate salt amounting to from 2 to 10 percent of the granules on a dry basis. The water soluble phosphate salt formed is selected to exhibit a property of reacting with metal surfaces to form protective coatings of metal phosphates. The base selected to form these phosphates is preferably sodium hydroxide, sodium carbonate, potassium hydroxide, or ammonia.

Mixing is continued in the fluid bed until the chloride salts are bound into damp agglomerates and which are then dried at a temperature of from 60° to 120° C. to a moisture content of from 0.1 to 2.0 percent to harden the agglomerates into attrition resistant granules.

To provide the most preferred attrition resistant ice melting granular composition prepared by the foregoing method, the water soluble chloride salt concentration must amount to from 95.8 to 97.9 percent, the alkali nitrite from 0.05 to 0.10 percent, the surface deactivating corrosion inhibitor from 0.05 to 0.10 percent, and the water soluble phosphate salt from 2 to 4 percent of the dry granules.

EXAMPLES OF THE PREFERRED EMBODIMENT

The examples provided here demonstrate the utility of the present invention and its preferred embodiment. The first two examples demonstrate the preferred deicer composition and its utility as an effective ice melter.

Example 1

The composition evaluated comprised a water soluble chloride salt of sodium, sodium chloride, and a water soluble phosphate salt, monosodium phosphate, which exhibited a property of chemically reacting with ferrous and aluminum metal surfaces to form protective coatings of insoluble phosphate salts. The soluble phosphate salt was mixed in the chloride salt as a concentrated 55 percent aqueous solution to serve as a binder and buffering agent to provide hard particles at a pH of 6.6 when the particles were dried. The composition of the homogeneous particles after screening through a 4 mesh U.S. Standard Screen was as follows:

| Components | Wt % |
|---|---|
| Sodium Chloride | 91.9 |
| Monosodium Phosphate | 7.0 |
| Moisture | 1.1 |

Freezing points were measured for several concentrations of the granules, and for comparison, urea, in water. The results are listed as follows:

| | Freezing Points, °C., For Aqueous Solutions | | |
|---|---|---|---|
| Ice Melter | 10% (wt) | 20% (wt) | 23% (wt) |
| Example 1 | −6 | −15 | −20 |
| Urea | −2 | −6 | −11 |

Example 2

In a further test using the deicing materials of Example 1, a block of Portland Cement Concrete was taken from a walkway, cut to a 1 square foot area two inches thick, placed in a freezer at a temperature of −6° C. Water was sprayed onto the block until an ice layer of about one-eighth thickness covered the block. Then, 45 grams (0.1 pound) of the Example 1 granules were evenly applied to the ice layer. One hour after the application, the ice was melted and most of the melt had run off the block.

In similar tests using commercial calcium magnesium acetate, essentially no melting had occurred in one hour.

Example 3

This example demonstrates that the deicer composition of this invention is an effective inhibitor of corrosion on metals it may contact.

Samples of mild steel A-66 and aluminum 6061 were prepared, measuring ⅛"×¾"×1½". These polished coupons were suspended into 200 ml beakers of tap water containing 5 percent deicer. The samples were left in the ice melter-water solutions for 10 days at ambient temperature, with the level of the liquid maintained each day by adding distilled water. The corrosion test data are summarized in the following table.

| | Corrosion Rates, Mils/Year | |
|---|---|---|
| Ice Melter Solution | Steel A-36 | Aluminum 6061 |
| Example 1 | 0.9 | 0.03 |
| Salt | 12 | 0.3 |

No pitting or damage of any kind was noted on the metal samples in contact with the Example 1 ice melter solution.

Example 4

This example demonstrates the reduced spalling of Portland Cement Concrete and asphalt when treated with the ice melter composition of this invention.

The Portland Cement Concrete of Example 2 and a similarly sized block of asphalt walkway were surface cleaned and put through 20 freeze-thaw cycles using the composition of Example 1, salt, and urea. After the 20th thaw, the blocks were dried, surface cleaned, and all of the loose scales and powder recovered in the freeze-thaw cycles and the final brushings were collected and weighed. The losses were counted as surface spallings. The spalling for the test materials are listed as follows:

| | Wt Loss (lbs/square ft.) | |
|---|---|---|
| Test Materials | Concrete | Asphalt |
| Example 1 | .088 | .106 |
| Salt | .161 | .240 |
| Urea | .277 | .301 |

Example 5

This example demonstrates the preferred method of preparing the composition of the present invention.

To a 300 liter Littleford high intensity mixer equipped with a mechanically fluidizing steel bladed plow, a high speed mixing chopper blade, a heating jacket, and a liquid spraying device, was added the following materials:

| Ingredients (all −20 U.S. Std. Mesh) | lbs |
|---|---|
| Potassium Chloride | 47.0 |
| Sodium Chloride | 47.0 |
| Sodium Nitrite | 0.1 |
| Sodium Borate | 0.1 |

The chloride salts and inhibitors were mechanically fluidized by operating the steel bladed plows, and aqueous phosphoric acid with a 60 percent $P_2O_5$ concentration was sprayed onto the fluidized bed and sodium hydroxide flakes were alternately added with the phosphoric acid to bring the pH of the mixture to 6.8. The aqueous soluble phosphate salt amounted to 3.0 pounds dry weight. The mixing and reaction of the aqueous phosphoric acid and sodium hydroxide was continued for 8 minutes when the reaction was complete and the sodium and potassium chlorides, sodium nitrite, and sodium borate were homogeneously bound into damp agglomerates by the aqueous sodium phosphate in the mixture.

The heating jacket was activated to increase the temperature of the mixture to 102° C. The product was dried by a stream of air blowing through the fluidized damp granules until moisture content was reduced to 0.3 percent and the damp agglomerates were converted to hard attrition resistant granules by the drying.

The product granules were screened to provide −4+10 mesh granules, with an average crush strength of 3.7 pounds for −4 mesh granules.

I claim:

1. An attrition resistant particulate composition for melting ice and inhibiting corrosion of metals and spalling of Portland Cement concrete and asphalt, with enhanced corrosion inhibition, the composition comprising:

(a) a water soluble chloride salt of an alkali or alkaline earth metal amounting to between 90 and 98 percent of the particulate composition containing between 0.05 and 1.0 percent of an oxygen scavenger selected from the group consisting of sodium nitrite, potassium nitrite, and sodium fluoborate, and also containing a surface deactivating corrosion inhibitor selected from the group consisting of sodium borate, sodium silicate, potassium silicate, sodium ferricyanide, sodium ferrocyanide, sodium ferrocyanate, and triethanolatine amounting to between 0.05 and 1.0 percent; and, (b) a water soluble ammonium or alkali metal phosphate salt amounting to between 1 and 10 percent on a dry basis, the ammonium or alkali metal phosphate salt exhibiting a property of chemically reacting with metal surfaces to form protective coatings of insoluble metal phosphate salts, the water soluble ammonium or alkali metal phosphate salt admixed with the chloride salt containing the oxygen scavenger and surface deactivating corrosion inhibitors as an aqueous solution at a concentration of between 40 and 85 percent, thereby serving as an adhesive and a buffering agent to provide hard particles at a pH of between 5 and 8, wherein the composition has a moisture content amounting to between 0.1 and 4.0 percent.

2. The particulate composition of claim 1 wherein the water soluble chloride salt is selected from the group consisting of potassium chloride, sodium chloride, magnesium chlorides calcium chloride and mixtures thereof.

3. The particulate composition of claim 1 wherein the water soluble ammonium or alkali metal phosphate is selected from the group consisting of ammonium phosphate, sodium phosphate, potassium phosphate, ammonium polyphosphate, sodium polyphosphate, sodium pyrophosphate, and potassium pyrophosphate.

4. A method of preparing attrition resistant ice melting granules for effectively melting ice without causing damage to metal, concrete and asphalt surfaces contacted by said granules, the method comprising:

(a) agitating a water soluble chloride salt of an alkali or alkaline earth metal, amounting to between 90 and 98 percent of the attrition resistant granules at a temperature of from 45° to 110° C.;

(b) admixing therewith sufficient aqueous ammonium or alkali metal phosphate salt solution to produce a pH between 5 and 8 and to bind the chloride salt into damp agglomerates, the aqueous ammonium or alkali metal phosphate salt solution containing a concentration of water soluble phosphate salt between 40 and 85 percent, the phosphate salt amounting to between 2 and 10 percent of the granules on a dry basis, and exhibiting a property of chemically reacting with aluminum and ferrous metal surfaces to form insoluble protective phosphate coatings of metal phosphates; and, (c) drying to a moisture content of between 0.1 and 4.0 percent to harden the agglomerates to attrition resistant granules.

5. The method of claim 4 wherein the water soluble chloride salt is selected from the group consisting of potassium chloride, sodium chloride, magnesium chloride, calcium chloride, and mixtures thereof.

6. The method of claim 4 wherein the aqueous ammonium or alkali metal phosphate salt is selected from the group consisting of ammonium phosphate, sodium phosphate, potassium phosphate, ammonium polyphosphate, sodium polyphosphate, sodium pyrophosphate, and potassium pyrophosphate.

7. The method of claim 4 wherein the aqueous ammonium or alkali metal phosphate salt amounts to between 2 and 7 percent, and the attrition resistant granules are dried to a moisture content of between 0.1 and 2.0 percent.

8. The method of claim 4 wherein the aqueous ammonium or alkali metal phosphate salt is formed in-situ by reaction of phosphoric acid in solution with a salt forming base selected from the group consisting of sodium hydroxide, sodium carbonate, potassium hydroxide, potassium carbonate, anhydrous ammonia, and aqueous ammonia.

9. A method of preparing attrition resistant ice melting granules for effectively melting ice with enhanced inhibition to corrosion of metals contacted by said granules, the method comprising:

(a) agitating a water soluble chloride salt of an alkali or alkaline earth metal selected from the group consisting of potassium, sodium, magnesium, calcium, and mixtures thereof, amounting to between 90 and 98 percent of the attrition resistant granules by means of a mechanically fluidizing bladed plow and a high speed mixing chopper blade until the chloride salt forms a fluidized bed of chloride salt particles, and admixing therewith between 0.05 and 1.0 percent of an alkali nitrite, and between 0.05 and 1.0 percent of a surface deactivating corrosion inhibitor, selected from the group consisting of sodium borate, sodium silicate, and sodium ferricyanide, while the chloride salt particles remain mechanically fluidized;

(b) then, admixing therewith in the fluidized bed sufficient aqueous phosphoric acid, containing between 45 and 61 percent $P_2O_5$, and sufficient base to react with the phosphoric acid to provide a pH between 6.0 and 7.5 and produce a water soluble ammonium or alkali metal phosphate salt solution exhibiting a concentration of between 40 and 85 percent, the phosphate salt produced amounting to between 2 and 10 percent of the granules on a dry basis and exhibiting a property of reacting with metal surfaces to form an insoluble protective coating of metal phosphates, the base reacted with the phosphoric acid selected from the group consisting of sodium hydroxide, sodium carbonate, potassium hydroxide, and ammonia;

(c) continuing mixing in the fluidized bed until the chloride salts are bound into damp agglomerates; and, (d) drying the agglomerates at a temperature between 60° and 120° C. to a moisture content of between 0.1 and 2.0 percent to harden the agglomerates into attrition resistant granules.

10. The attrition resistant ice melting granules prepared by the method of claim 9 wherein the water soluble chloride salt amounts to between 95.8 and 97.9 percent, the alkali nitrite amounts to between 0.05 and 0.10 percent, the surface deactivating corrosion inhibitor amounts to between 0.05 and 0.10 percent, and the water soluble ammonium or alkali metal phosphate salt amounts to between 2 and 4 percent of the ice melting granules.

* * * * *